May 24, 1966 W. E. FOLKERTS 3,252,348
VEHICLE STEERING GEAR
Filed Aug. 29, 1963
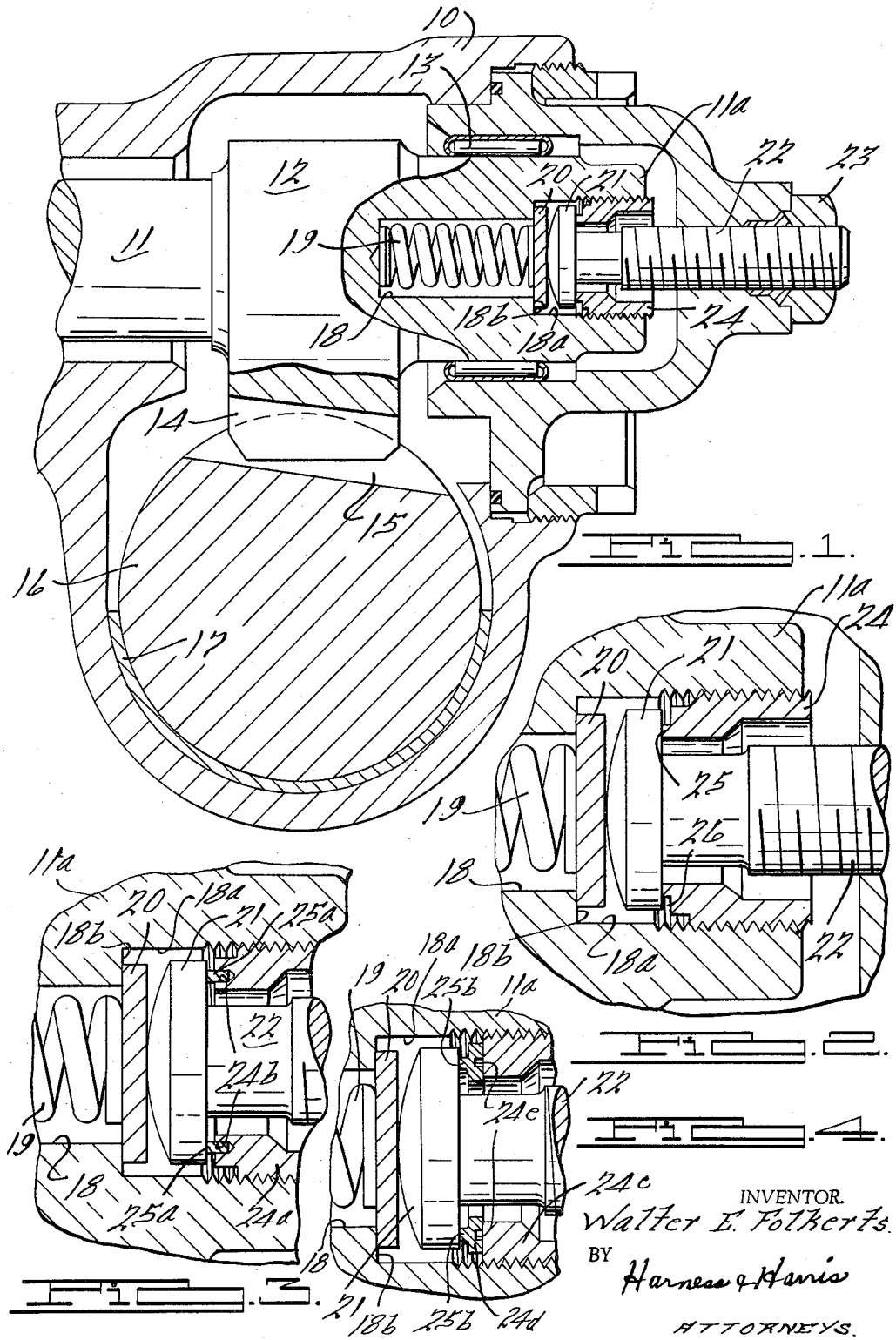
INVENTOR.
Walter E. Folkerts.
BY Harness & Harris
ATTORNEYS.

United States Patent Office 3,252,348
Patented May 24, 1966

3,252,348
VEHICLE STEERING GEAR
Walter E. Folkerts, Hazel Park, Mich., assignor to Chrysler Corporation, Highland Park, Mich., a corporation of Delaware
Filed Aug. 29, 1963, Ser. No. 305,301
6 Claims. (Cl. 74—409)

This invention relates to improvements in vehicle steering gears.

In one type of vehicle steering gear, the teeth of a rocking sector gear intermesh with the teeth of a gear rack reciprocable transversely of the pivot axis of the sector gear. The latter is connected by a suitable steering linkage with the dirigible wheels of the vehicle, whereas the gear rack is either manually or power actuated to effect the desired steering movement. During the break-in period of the automobile, as for example the first ten thousand miles of driving, the intermeshing teeth of the sector gear and gear rack are subject to comparatively rapid wearing until these teeth seat firmly against each other. Thereafter the rate of wear is appreciably retarded.

In order to accommodate the initial break-in wearing of the intermeshing teeth and to prevent play or lost motion therebetween in consequence of such wearing, these teeth are bias formed with respect to each other so that upon relative axial movement therebetween in one direction, the teeth move more snugly into mesh with each other. Resilient means is frequently provided to induce the relative axial movement. Further, in order to prevent undue wearing of the teeth after the break-in period, adjustable movement limiting means is provided to engage the sector gear to limit said relative movement.

Inasmuch as the driving public will seldom readjust the adjustable movement limiting means after the initial break-in wearing of the intermeshing teeth has taken place, it has been customary to incorporate abradable means with the movement limiting means, such that the abradable means will wear at approximately the same rate as the intermeshing teeth and result in automatic adjustment of the lost motion and tension in the gear mechanism. Because the rate of wearing between the intermeshing teeth is slower after the break-in period, continued use of the abradable material after the break-in period will allow excessive axial movement of the sector gear relative to the movement limiting means. In consequence wearing between the intermeshing teeth after the break-in period will be excessive.

For this reason, the abradable wear material employed heretofore has been of limited thickness. Inasmuch as the total amount of axial movement required of the sector gear to accommodate the initial break-in wearing is between approximately .01 and .02 inch, the thickness of the abradable material has been similarly limited in thickness, with the result that when the abradable material is nearly worn through, it crumbles and leaves a congestion of pieces in the adjustment mechanism.

An object of the present invention has been to provide simple and economical means for avoiding the foregoing problems, yet which enables the use of a limited thickness abradable wear material.

Another object is to provide a steering gear of the above general character which includes a nut fabricated of abradable wear material. The nut, which screws into the sector gear and engages the adjustable movement limiting means, is provided with a comparatively broad surface area confronting a mating hardened broad surface area of the movement limiting means. The nut is also provided with a projection of abradable material of comparatively small cross sectional area in engagement with the hardened surface area of the movement limiting means.

By virtue of this construction, the projection of thin cross sectional area will wear rapidly during the initial break-in period to correspond with the rapid wear between the intermeshing teeth. Thereafter, the comparatively broad surface area of the abradable nut will engage the broad area of the movement limiting means to enable continued wearing of the nut at a rate commensurate with the retarded rate of wearing between the intermeshing teeth.

Inasmuch as the base of the projection of small cross sectional thickness is supported by the body of the nut, the projection will not tend to crumble as it wears. In fact it will become stronger as it wears because it will be subject to less leverage as it grows thinner. In addition, by suitably determining the cross sectional thickness of the projection of the nut, its hardness can be increased, thus a wear element of harder or less abradable material can be employed than would otherwise be feasible.

Other objects of this invention will appear in the following description and appended claims, reference being had to the accompanying drawings forming a part of this specification wherein like reference characters designate corresponding parts in the several views.

FIGURE 1 is a fragmentary sectional view through a steering gear embodying the present invention, taken longitudinally of the pivot axis of the sector gear.

FIGURE 2 is an enlarged view of a portion of FIGURE 1.

FIGURE 3 is a view similar to FIGURE 2, showing a modification.

FIGURE 4 is a view similar to FIGURE 2, showing still another modification.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings an embodiment of the present invention is illustrated by way of example in an automobile steering gear comprising a housing 10 containing a rock shaft 11 pivotal about its longitudinal axis. Integral with the shaft 11 is a sector gear 12 adjacent a stub end 11a of the shaft 11 journalled within the housing 10 by means of a needle bearing set 13.

The sector gear 12 is provided with a plurality of arcuately arranged teeth 14 intermeshing with a linear set of teeth 15 of a gear rack 16 mounted in housing 10 on a sleeve bearing 17 for reciprocating transversely of the axis of shaft 11. In accordance with customary practice the teeth 14 and 15 are bias formed with respect to each other so that upon axial shifting of rock shaft 11 and sector gear 12 to the left in FIGURE 1, the teeth 14 and 15 will be brought into closer engagement with each other to take up slack or play therebetween.

Formed coaxially in the stub shaft 11a is a cylindrical recess 18 which enlarges axially endwise at 18a to provide an anular shoulder 18b in the stub shaft 11a. A coil spring 19 is seated under compression between one end of recess 18 and a retaining washer 20 confronting shoulder 18b. Washer 20 in turn is abutted by the annular movement limiting head 21 of a screw threaded shaft 22 adjustably screwed coaxially into the housing 10 and locked in adjusted position by a suitable lock nut 23.

In operation of the construction described, it is apparent that upon reciprocation of gear rack 16, the sector gear 12 is caused to rock pivot shaft 11. The latter is suitably secured at its outer end by a steering gear linkage with the dirigible wheels of the automobile to effect the steering movement. During approximately the first ten thousand miles of driving, the intermeshing teeth 14 and 15 rapidly wear into firm seating engagement with each other. During this action, play between the intermeshing teeth 14 and 15 that would otherwise result is avoided by means of spring 19 which urges the rock shaft 11 and sector gear 12 axially to the left in FIGURE 1.

In order to control the rate of leftward movement of sector gear 12 aproximately in synchronism with wearing of the intermeshing teeth 14 and 15, an externally threaded nut 24 is screwed into the internally threaded end of recess portion 18a into abutment with a plane and comparatively broad annular hardened surface of the movement limiting head 21. The inner end of nut 24 is provided with an integral annular wearing tip or projection 25 coaxial with shaft 22. The nut 24 and tip 25 are formed from a suitable abradable material susceptible of rapid frictional wearing against the hardened head 21 upon pivoting of the sector gear 12 and integral stub shaft 11a. In this regard, the nut 24 is suitably staked to stub shaft 11a to rotate therewith.

Inasmuch as the comparatively rapid initial break-in wearing of the teeth 14 and 15 will result in approximately only .015" axial play, the axial length of the annular tip 25 is accordingly dimensioned to provide a clearance 26 of approximately .015" between the broad plane annular wear resistant surface of movement limiting head 21 and a mating annular broad plane surface of the juxtaposed end of nut 24. Accordingly, upon wearing away of annular tip 25 of small cross sectional area, spring 19 will urge rock shaft 11 leftward until the main body of comparatively large cross sectional area of nut 24 engages the head 21. Thereafter the rate of wear of the abradable material of nut 24 will be materially retarded to correspond with the retarded rate of wear between the teeth 14 and 15 after the initial break-in period.

FIGURE 3 illustrates a modification showing a nut 24a similar in all respects to the nut 24 except that it is provided with a plurality, as for example three recesses 24b, each being filled with a plug or projection 25a of abradable material which projects axially a distance comparable to the clearance 26. An advantge of this construction is that by controlling the number of projections 25a, the total cross sectional area thereof can also be controlled. Likewise, the abradable material of the projections 25a may have a different hardness and rate of wear than the abradable material of nut 24a, so that the differential wearing rate between the break-in period and the subsequent period may be readily predetermined.

In FIGURE 4, the nut 24c, which otherwise corresponds to nut 24 of FIGURE 2, need not be of abradable material. Instead, a washer 24d of abradable material is interposed between the nut 24c and head 21. Instead of the inserts 25a, a plurality of projections 25b are extruded from the body of the washer 24d, as for example by a punching operation which leaves a corresponding plurality of recesses 24e in the face of washer 24d opposite the projections 25b respectively. In other respects, the structure illustrated in FIGURE 4 is the same as in FIGURES 2 and 3.

I claim:

1. In a vehicle steering unit, a housing, sector gear means pivotally mounted in said housing, a gear rack reciprocable transversely of said sector gear means, said sector gear means and gear rack having intermeshing gear teeth effective to rock said sector gear means upon reciprocation of said gear rack, said intermeshing teeth being biased relative to each other to take up play therebetween upon axial shifting of said sector gear means in one direction along its axis of rocking and being susceptible of comparatively rapid initial break-in wear as they seat into each other, force exerting means yieldingly urging said sector gear means in said one direction, movement limiting means secured in said housing, wear means of abradable material susceptible of frictional wearing and engaging said sector gear means to pivot therewith, said wear means having a comparatively large surface area confronting said movement limiting means and also having a projection from said surface area of comparatively small cross sectional area, said projection engaging said movement limiting means to limit movement of said sector gear means in said one direction and to accommodate axial movement of said sector gear means in said one direction upon wearing of said projection during said initial break-in wearing, said large surface area of said wear means being adapted to engage said movement limiting means and to accommodate continued axial movement of said sector gear means in said one direction at a retarded rate subsequent to the wearing of said projection.

2. In the combination according to claim 1, said movement limiting means comprising a shaft coaxial with said sector gear means and having an annular shoulder providing a hardened annular surface, said wear means comprising a nut screwed coaxially into said sector gear means with its surface area confronting said hardened surface, said projection comprising an annulus in cross sectional area and engaging said hardened annular surface coaxially, and said force exerting means comprising resilient means yieldingly engaging said sector gear means and adjustable means.

3. In the combination according to claim 1, said movement limiting means comprising a shaft coaxial with said sector gear means and having an annular shoulder providing a hardened annular surface, said wear means comprising a nut screwed coaxially into said sector gear means with its surface area confronting said hardened surface, said projection comprising an annulus in cross sectional area and engaging said hardened annular surface coaxially, said large surface area of said wear means being adapted to engage said hardened annular surface of said movement limiting means and to accommodate continued axial movement of said sector gear means in said one direction at a retarded rate subsequent to the wearing of said projection.

4. In a vehicle steering unit, a housing, sector means pivotally mounted in said housing, a gear rack reciprocable transversely of said sector gear means, said sector gear means and gear rack having intermeshing gear teeth effective to rock said sector gear means upon reciprocation of said gear rack, said intermeshing teeth being biased relative to each other to take up play therebetween upon axial shifting of said sector gear means in one direction along its axis of rocking and being susceptible of comparatively rapid initial break-in wear as they seat into each other, force exerting means yieldingly urging said sector gear means in said one direction, a shaft secured in said housing coaxially with said sector gear means and having an annular shoulder providing a hardened annular surface, a nut screwed coaxially into said sector gear means around said shaft toward said hardened surface, a washer interposed between said nut and hardened surface, said washer comprising abradable material susceptible of frictional wearing and having a comparatively large surface area confronting said hardened surface and also having an integral projection from said surface area of comparatively small cross sectional area, said projection engaging said hardened surface to limit movement of said sector gear means in said one direction and to accommodate axial movement of said sector gear means in said one direction upon wearing of said projection during said initial break-in wearing, said large surface area of said washer being adapted to engage said hardened annular surface and to accommodate continued axial movement of said sector gear means in said one direction at a retarded rate upon wearing of said washer subsequent to the wearing of said projection.

5. In a vehicle steering unit, a housing, sector means pivotally mounted in said housing, a gear rack reciprocable transversely of said sector gear means, said sector gear means and gear rack having intermeshing gear teeth effective to rock said sector gear means upon reciprocation of said gear rack, said intermeshing teeth being biased relative to each other to take up play therebetween upon axial shifting of said sector gear means in one direction along its axis of rocking and being susceptible of comparatively rapid initial break-in wear as they seat into each other, force exerting means yieldingly urging said sector gear means in said one direction, movement limiting means secured in said housing and having a shoulder providing a hardened surface, a nut screwed into said sector gear means toward said hardened surface, a washer interposed between said nut and hardened surface, said washer comprising abradable material susceptible of frictional wearing and having a comparatively large surface area confronting said hardened surface and also having an integral projection from said surface area of comparatively small cross sectional area, said projection engaging said hardened surface to limit movement of said sector gear means in said one direction and to accommodate axial movement of said sector gear means in said one direction upon wearing of said projection during initial break-in wearing, said large surface area of said washer being adapted to engage said hardened annular surface and to accommodate continued axial movement of said sector gear means in said one direction at a retarded rate upon wearing of said washer subsequent to the wearing of said projection.

6. In combination, a pair of gear members having intermeshing gear teeth biased relative to each other to take up play therebetween upon relative movement thereof with respect to each other in one direction and being susceptible of comparatively rapid initial break-in wearing as they seat into each other, force exerting means yieldingly urging said relative movement in said one direction, and means to limit said relative movement comprising fixed movement limiting means and movement limiting means carried by one of said gear members to move therewith and confronting said fixed movement limiting means to engage the same upon said relative movement in said one direction, one of said movement limiting means comprising abradable material susceptible of frictional wearing and having a comparatively large surface area confronting the other of said movement limiting means and also having a projection from said large surface area of comparatively small cross sectional area engaging said other movement limiting means to accommodate said relative movement gradually in said one direction upon wearing of said projection during said initial break-in wearing, said large surface area engaging said other movement limiting means upon said wearing of said projection to accommodate a continuation of said relative movement gradually in said one direction at a retarded rate.

References Cited by the Examiner

UNITED STATES PATENTS 2,936,643    5/1960    Smith et al. _____ 74—409

MILTON KAUFMAN, *Primary Examiner.*